United States Patent Office 3,631,138
Patented Dec. 28, 1971

3,631,138
SOLUTION STABLE URETHANE POLYMER COMPOSITIONS AND PRODUCTS THEREFROM
Timothy Victor Peters, Rte. 2, Rockaway Road,
Lebanon, N.J. 08833
No Drawing. Continuation of application Ser. No. 699,362, Jan. 22, 1968, which is a continuation-in-part of application Ser. No. 618,280, Feb. 17, 1967. This application Apr. 24, 1970, Ser. No. 29,752
Int. Cl. C08g 51/44, 22/06
U.S. Cl. 260—32.6 N         12 Claims

ABSTRACT OF THE DISCLOSURE

A high molecular weight polyurethane having a segment derived by chain extension of a prepolymer formed by the reaction of a hydroxyl-terminated polymer with at least two diisocyanates, one having no substituents alpha to the isocyanate groups and another having a substituent alpha to an isocyanate group; and processes for the preparation thereof which include the above reactions.

This application is a continuation of application Ser. No. 699,362, filed Jan. 22, 1968, which is a continuation-in-part of my application, Ser. No. 618,280, filed Feb. 17, 1967 now abandoned.

This invention is a new class of high molecular weight substantially linear polyurethanes, particularly useful as elastomeric filaments. At least one segment of the polyurethane is formed by reacting a novel, isocyanate-terminated prepolymer with a chain extension agent, such as ethylene diamine. The prepolymer is produced by reacting a hydroxyl-terminated polymer, such as a polyester glycol, with (1) a major amount, on a mole basis, of at least one diisocyanate without any substituent alpha to either isocyanate group and (2) a minor amount, on a mole basis, of at least one diisocyanate having a substituent group alpha to at least one isocyanate group.

These new urethane polymer compositions have excellent mechanical properties and have a high solubility in, and form stable solutions with, organic solvents such as dimethylformamide, dimethylacetamide and dimethylsulfoxide.

Elastomeric urethane polymers are now well-known in the art. They are very useful in producing a wide variety of shaped articles such as films, fibers, foams, oil-resistant gaskets and seals, as well as porous and nonporous sheet structures. Solutions of urethane polymers in organic solvents are particularly useful in film-casting, fiber-spinning, and formulation of paints and coatings.

In the prior art, solutions suitable for spinning or forming of substantially linear urethane polymers have been produced, in general, by one of the following methods:

(1) A hydroxyl-terminated, substantially linear polyester or polyether having a molecular weight of about 500 to 5000 is reacted in bulk with an approximately stoichiometric amount of a diisocyanate. The resulting elastomer is then dissolved in a suitable solvent.

(2) An isocyanate-terminated urethane prepolymer is produced by reacting a hydroxyl-terminated, substantially linear polyester or polyether having a molecular weight of about 500 to 5000 with 1.5 to 2.5 the stoichiometric quantity of a diisocyanate. The resulting isocyanate-terminated urethane prepolymer is then chain-extended (i.e. further reacted to produce a high molecular urethane polymer) and combined with a solvent by one of the procedures shown below.

(a) The isocyanate-terminated urethane prepolymer is reacted in bulk with a chain extending agent for example a glycol, or diamine, or other compound containing two active hydrogens. The resulting polymer is then dissolved in a suitable solvent.

(b) An isocyanate-terminated urethane prepolymer is reacted with a chain-extending agent in the presence of a solvent.

The first two methods shown above (i.e. "1" and "2a") are limited to moderately slow reacting systems, since the reactions of an isocyanate group with an active hydrogen, as from a hydroxyl or amine group, are exothermic and cannot be controlled in bulk with fast-reacting systems such as symmetric aromatic, isocyanate-terminated urethane prepolymers in combination with aliphatic, diprimary amine chain extenders. Even with the slower reacting systems it is often extremely difficult to dissolve the resulting urethane polymers. Dissolution generally requires heat and extended high-shear agitation which often leads to undesirable polymer degradation.

The solution chain-extension method shown above as "2b" is applicable to faster reacting systems. This method, however, is of only marginal utility when used with symmetric aromatic diisocyanates and aliphatic, diprimary amines, since gel structures are formed almost invariably during the solution chain-extension step. The gel structures frequently may be dissolved by heat and high shear mixing but this in turn leads to the undesirable effect of partial polymer degradation.

It is well-known to those skilled in the art that superior mechanical properties are only obtained when the diisocyanates and chain extenders are selected so as to provide short segments in the polymer chain exhibiting high degrees of interaction with other such segments of the same and neighboring polymer molecules. The most useful diisocyanates are, in general, symmetric aromatic diisocyanates such as, for example 1,5-naphthylene "diisocyanate, paraphenylene diisocyanate and metaxylylene diisocyanate. The moderately fast reacting chain fast reacting chain extenders which are useful with such diisocyanates for solution chain extension are generally hindered or ring-type diamines such as piperazine and menthane diamine. The rings or hindering side groups tend to reduce the desired intermolecular attraction forces within the polymer molecule, so that the resulting polymer compositions are characterized by good solubilities but relatively poor mechanical properties. Chain extenders, such as ethylene diamine, tetramethylene diamine and 1,3-diaminopropane, which do not have significant force-disrupting groups and therefore should give urethane polymers with superior mechanical properties, nevertheless, cannot be utilized to produce good quality polymer solutions by the prior methods because of their very fast reaction rates with isocyanates and the gel structures which result with the disadvantages stated above.

Urethane polymer compositions prepared by solution chain extension according to the teachings of the prior art methods are further characterized in that they cannot be readily resolubilized once they have been formed into fibers, films or other shaped articles and the solvent removed. This is particularly true for compositions exhibiting good mechanical properties in filament form. The lack of good solubility is an obvious disadvantage since products, off-standard because of size variation or poor formations, cannot be redissolved and reprocessed to acceptable products.

My copending application S.N. 340,548, filed Jan. 27, 1964, as a continuation-in-part of my application S.N. 216,735, now abandoned, teaches and claims a method for obtaining gel-free urethane polymer solutions which requires chain extension with at least two different diamines in two distinct steps. This method, while representing a significant advance over the prior art, is rather complicated for industrial use, since the additional chain-extension step is required. In addition, the viscoelastic behavior of the solutions formed often diverges significantly from Newtonian character.

The polymer compositions of this invention have a high solubility in a solvent such as dimethylformamide and in such a solvent give homogeneous solutions having substantially stable rheological properties. Such solutions are suitable for further processing into films, filaments, bristles, molded objects and other shaped products. Such products possess excellent mechanical properties and can be readily redissolved for multiple reprocessing into shaped forms.

This new class of substantially linear urethane polymer compositions contain the residues of at least two diisocyanates in the molecular structure. They may be conveniently prepared on either a laboratory or industrial scale by reacting a 1.5 to 2.5 molar excess of a diisocyanate mixture comprising a major amount of a diisocyanate containing no substituent groups alpha to the isocyanate groups plus a minor portion of a diisocyanate containing a substituent group in the alpha position to at least one of the isocyanate groups of said diisocyanate, with a 500 to 5000 molecular weight, hydroxyl-terminated polyester, polyether, polyester/ether, or a mixture of two or more of them, to produce a substantially linear isocyanate-terminated urethane prepolymer. The resulting substantially linear isocyanate-terminated urethane prepolymer is then chain-extended in the presence of a solvent such as dimethylformamide, dimethylacetamide or dimethylsulfoxide by an aliphatic diprimary amine, or mixture of aliphatic diprimary amines, (which may include minor amounts of other diamines) to produce a substantially linear urethane polymer. The solutions of substantially linear urethane polymers may then be further processed to produce films, fibers, or other shaped articles. Because of their excellent mechanical properties, the urethane polymers produced are particularly useful in manufacturing filaments and fibers by the conventional methods of either wet- or dry-spinning.

The hydroxyl-terminated polyester, polyether, and polyester-ethers useful in this invention have molecular weights between 500 and 5000 and preferably between 1500 and 2500. Mixtures of such hydroxyl-terminated polymers may also be used and, in this case, the average molecular weight of the mixture should be within the limits given above. For best results, when the end product is to be a filament or fiber, the glycol or glycol mixture should have a melting point below about 50° C.

The hydroxyl-terminated polyesters useful in this invention are generally prepared for example, by reacting suitable amounts of low molecular weight glycols with dicarboxylic acids or diacid chlorides. Examples of suitable low molecular weight glycols are ethylene glycol, propylene glycol, butane-1,4-diol, 2,2-dimethylpropane-1,3-diol, and hexane-1,6-diol. Frequently it is also desirable to use a mixture of low molecular weight glycols in forming the hydroxyl-terminated polyester. Dicarboxylic acids useful in the polyester reaction include, for example, adipic acid, succinic acid, suberic acid, sebacic acid, and azelaic acid. In some cases, it is also desirable to use mixture of acids. Terephthalic acid may sometimes be used as a mixture with other acid such as, for example, adipic acid. The use of terephthalic acid alone, however, is not desirable since the resulting polyester glycol in most cases will have a melting point above 60° C. The corresponding acid chlorides of these same acids may be used.

Polyester glycols may also be produced by polymerizing lactones and terminating the chains with hydroxyl end groups. I have found hydroxyl-terminated polymers based on epsilon-caprolactones to be particularly useful.

Useful polyether glycols include, for example, polypropylene-ether glycol, polytetramethylene-ether glycol, and polyhexamethylene-ether glycol. Polyethylene-ether glycol may be used as a mixture with other polyethers or polyesters but is of little value alone, since its use results in highly hydrophilic products.

The polyether-ester glycols useful in this invention are prepared by reacting a lower molecular weight ether glycol such as diethylene glycol, triethylene glycol, dipropylene glycol, or tripropylene glycol with either an acid chloride or one of the diacids referred to above.

For the substantially linear hydroxyl-terminated 500 to 5000 molecular weight component of the polymer structure, I prefer polytetramethylene-ether glycol and polyester glycols comprising the reaction products of adipic acid with ethylene glycol, propylene glycol, 2,2-dimethylpropane-1,3-diol, hexane-1,6-diol, or mixtures thereof. I also find the molecular weight range between 1500 and 2500 to be most desirable.

The molar ratio of total diisocyanate to the hydroxyl-terminated polymer should be in the range of 1.5 to 2.5 and preferably between 1.8 and 2.2. Of the total diisocyanate, the diisocyanate having a substituent group in a position alpha to at least one of the isocyanate groups should be present on a mole basis of between 1 and 49 percent, desirably between 2 and 25 percent and preferably between 4 and 10 percent, the remainder being the diisocyanate having no substituents alpha to the isocyanate groups.

Specific reaction conditions are dependent upon the particular combination of hydroxyl-terminated polymers and diisocyanates used. Conditions should be sufficient, however, to react substantially all available hydroxyl groups but not so severe as to cause a reaction between NCO groups and urethane hydrogens. For most cases, a temperature of between 95 and 105° C. and a reaction time of between 30 and 90 minutes is sufficient.

Diisocyanates containing no substituents alpha to the isocyanate groups which are particularly useful in this invention include paraphenylene diisocyanate, paraxylene diisocyanate, metaxylylene diisocyanate, 4,4'-diphenylene diisocyanate, 4,4'-diphenylmethane diisocyanate, 1,5-naphthylene diisocyanate, cyclohexylene-1,4-diisocyanate, and 1,6-hexamethylene diisocyanate. These diissocyanates may be used alone or in mixtures. Because of its ready availability and excellent mechanical properties of the resulting polymers, I prefer 4,4'-diphenylmethane diisocyanate, commonly referred to as MDI.

Useful diisocyanates having a substituent group in the alpha position to at least one of the isocyanate groups include the following: tolylene-2,4-diisocyanate, toylene-2,6-diisocyanate, mesitylene diisocyanate, durene diisocyanate, 3,3'-dimethyl-4,4'-diphenylmethane diisocyanate, 3,3'-dimethyl-4,4' - diphenylene diisocyanate, 3,3'-dimethoxy,4,4'-diphenylene diisocyanate, 2,4'-diphenylmethane diisocyanate, 4-chloro-1,3-phenylene diisocyanate, and 2-ethyl-1,3-propane diisocyanate. Mixtures of these diisocyanates may also be used. Generally, suitable substituents groups, alpha to at least one isocyanate group, include alkyl, aralkyl, aryl, alkoxy, nitro and halogen radicals. A mixture comprising 80 percent of tolylene-2,4-diisocyanate with 20 percent tolylene-2,6-diisocyanate, is commercially available in bulk form and is particularly useful.

In most cases, it is desirable to dilute the isocyanate-terminated urethane prepolymer to 50 to 90 percent solids content with the same solvent to be used in chain extension prior to the chain-extension step. This dilution reduces the prepolymer's viscosity and facilitates transfer and mixing during the chain-extension step.

The chain extension may be carried out by adding diluted prepolymer to the rapidly agitated mixture of the chain extender in the solvent. When following this procedure, addition of prepolymer is discontinued as soon as the desired solution viscosity is attained. If the polymer solution is to be used for fiber formation, it is generally desirable to have a solution viscosity of between 50 and 500 poises. This visosity is norally attained when between 98 and 100 percent of the prepolyer required to react with all amine groups has been added to the solvent-diamine mixture, assuming the quantity of chain extender present is sufficient to give a percent solids of between 15 and 25 percent at stoichiometry. According to an alternate embodiment of the invention, a solution of the chain extender may be slowly added to a rapidly agitated, isocyanate-terminated urethane prepolymer solution. Once again, the addition is discontinued as soon as the desired polymer solution viscosity is attained.

A wide variety of diamines may be used in chain-extending the isocyanate-terminated urethane prepolymers. In order to obtain the best mechanical properties, however, I prefer to use low molecular weight aliphatic diprimary amines. Mixtures of such amines may also be used. Most useful, I have found, is ethylene diamine. Frequently it is desirable, however, to use minor amounts of other amines—such as, for example, piperazine, diaminopiperazine, methylimino-bis-propylamine, or methane diamine—along with the aliphatic diprimary amine extender in order to obtain improvements in color, dyeability, or other properties. If such is the case, at least 70 percent, preferably at least 80 percent, of the total diamine used should be an aliphatic diprimary amine.

Chain extension may also be carried out according to a two step method of chain extension as described in my copending application, S.N. 340,548.

In general, the same organic solvents, such as for example, dimethylacetamide, dimethylformamide, and dimethylsulfoxide, useful in preparing solutions of polyacrylonitrile are suitable in this invention. I prefer dimethylformamide.

A chain-terminating compound containing only one primary or secondary amino group may be used in the manner known in the art to control final polymer viscosity and to facilitate the chain-extension reaction. Such compounds may be mixed in with chain extender prior to the addition of the isocyanate-terminated urethane prepolymer. The amount of chain terminator used, however, should not exceed about 8 to 10 mole percent of the total amine groups present. I prefer to use less than 3 mole percent. Some examples of useful chain terminator compounds are dimethylamine, diethylamine, diethanolamine, and N,N-dimethyl-1,3-propanediamine.

Dyes, pigments, antioxidants, stabilizers, and other modifiers may be incorporated in the urethane polymer solution by addition at any stage in the manufacturing process. Preferably, however, such material should be added to the polymer solution subsequent to the chain-extension step. If an additive is to be incorporated at an earlier step as, for example, if the additive is to be mixed in with the hydroxyl-terminated polymer prior to reaction with the diisocyanate mixture, the compound must be substantially inert to the reactants.

In determining the suitability of a urethane polymer solution for further processing into shaped articles, I find it particularly useful to determine and compare three solution viscosities. These are: (1) the solution viscosity one hour after preparation, (2) the solution viscosity twenty-four hours after preparation, and (3) the solution viscosity immediately after high shear agitation of a solution twenty-four hours after preparation. For the high shear agitation referred to under "3," I find it convenient to agitate 500 ml. of the solution for 30 seconds in a one quart Waring Blendor. It is then useful to compare the ratios of "2" to "1" and "2" to "3" viscosities. The most desirable and readily processable solutions will have ratios of "2"/"1" and "2"/"3" near unity; that is, all three viscosities will be approximately equal. A high "2"/"1" ratio indicates that the polymer solution has begun to gel. A ratio less than unity will indicate that some degradation may have occurred. A high ratio of "2"/"3" indicates a high degree of "false body," i.e., weak intermolecular forces that are readily ruptured. A high ratio of "2"/"3" will cause severe problems with spinnerette performance in filament formation.

The following examples serve further to illustrate the invention. Unless otherwise indicated, all quantities given are on a weight or weight-percent basis. The exact weight of isocyanate-terminated urethane prepolymer added in the chain-extension step is not normally given. All chain extensions, however, are carried out to near stoichiometry. Solids contents of the resulting polymer solutions are also given so that the amount of prepolymer used is indirectly defined. Inherent viscosities were determined in DMF solutions containing 0.2% $CaCl_2$.

EXAMPLE I

(A) Prepolymer

One thousand grams of a hydroxyl-terminated, approximately 2000 molecular weight copolyester glycol comprising the reaction product of a 9 to 1 molar mixture of ethylene- and propylene-glycol with adipic acid was mixed with 250 grams of 4,4'-diphenylmethane diisocyanate. The mixture was heated for one hour at 95° C. with constant agitation to form an isocyanate-terminated urethane prepolymer. During the reaction period the resulting mixture was carefully protected from the atmosphere by a blanket of dry nitrogen.

(B) First-step chain extension

The above prepolymer was diluted with 500 grams of dimethylformamide to reduce its viscosity and to facilitate subsequent mixing and transfer operations. A portion of this diluted prepolymer was added slowly with vigorous stirring to a mixture of 500 grams of dimethylformamide (DMF) and 1.06 grams of methylimino-bis-propylamine until a viscosity of approximately 10 poises was attained.

(C) Second-step chain extension

The above first-step polymer solution was mixed with 200 grams of dimethylformamide, 4.0 grams ethylene diamine and 0.2 grams of diethanolamine. To this mixture was added slowly with rapid agitation a second portion of the diluted prepolymer from "B" above until a viscosity of approximately 120 poises was attained. This solution had a solids content of approximately 19.2 percent, was slightly on the amine side of stoichiometry, and had a polymer inherent viscosity of 1.35 when measured in a DMF solution. Additional properties are shown in the accompanying table.

(D) Filament formation

The urethane polymer solution from "C" was filtered and forced at a constant speed by means of a precision gear pump through a spinnerette having 10 holes, 0.04" in diameter, to produce 10 individual filaments which were then coalesced to produce a monofilament bundle having a denier of approximately 70. The spinnerette was immersed in a 40 percent solution of DMF in water. Length of bath travel was approximately 1 meter. The individual filaments were coalesced at the exit of this bath. Residual DMF was then extracted from the filament bundles in subsequent aqueous baths maintained at temperatures of 90° C. Filaments were then passed over a series of hot can drying rolls maintained at temperatures of 150° C. and wound up on bobbins at 40 meters per minute.

Solution properties as well as filament properties are shown in the accompanying table.

The polymer solution preparation part of this example follows the teaching of my copending application, Ser. No. 340,548.

EXAMPLE II

(A) Prepolymer

One thousand grams of a hydroxyl-terminated, 2000 molecular weight copolyester glycol comprising the reaction product of a 9 to 1 molar mixture of ethylene glycol and propylene glycol with adipic acid was mixed with 230 grams of 4,4'-diphenylmethane diisocyanate and 13.9 grams of an 80/20 mixture of 2,4-tolylene diisocyanate and 2,6 tolylene diisocyanate. The mixture was allowed to react for one hour at 95° C. under constant agitation to form an isocyanate-terminated urethane prepolymer. During the reaction period, the reacting mixture was carefully blanketed from the atmosphere by dry nitrogen.

(B) Chain extension

Dilution and chain extension of the isocyanate-terminated urethane prepolymer was carried out as in "B" and "C" parts of Example I. The resulting polymer solution had a viscosity of approximately 125 poises, a solids content of 19.2 percent, a polymer inherent viscosity of 1.32 when measured in a DMF solution, and was slightly on the amine side of stoichiometry.

(C) Filament formation

The resulting urethane polymer solution was converted into filaments using the same procedure as shown in Example I. Test results are summarized in the accompanying table.

EXAMPLE III

A portion of the diluted isocyanate-terminated urethane prepolymer from part "A" of Example "I" was slowly added to a vigorously agitated mixture consisting of 700 grams of dimethylformamide, 0.5 gram of diethanolamine, and 4.4 grams of ethylene diamine. Maximum solution viscosity attainable without gelatin in the reaction vessel was approximately 35 poises. At this point the solution has a percent solids of approximately 19.2. The inherent viscosity of the polymer was 1.28. The solution was immediately spun into filaments using the procedure shown in part "C" of Example "I" above. The solution gelled, however, within one hour after completion of chain extension. This gelation prevented a continuous spinning test and severely limited the quantity of sample yarn which could be prepared.

Additional data are summarized in the accompanying table.

EXAMPLE IV

Example "III" was repeated using diluted isocyanate-terminated urethane prepolymer from Example "II." A clear solution of approximately 130 poise viscosity was obtained without difficulty. This solution remained quite stable and showed no signs of gelation after standing for 40 days. The solution had a percent solids of 19.2 and the polymer had an inherent viscosity of 1.36.

Additional data are shown in the accompanying table.

TABLE

| Example | I | II | III | IV |
|---|---|---|---|---|
| 1 (viscosity 1 hr. after chain extension) | 120 | 125 | [1] Gel | 130 |
| 2 (viscosity 24 hrs. after chain extension) | 310 | 132 |  | 135 |
| 3 (viscosity 24 hrs. after chain extension and following agitation | 210 | 116 |  | 125 |
| 2/1 | 2.6 | 1.05 |  | 1.04 |
| 2/3 | 1.5 | 1.14 |  | 1.08 |
| Filament properties: |  |  |  |  |
| Tenacity, g./tex | 6.8 | 6.9 | [2] 6.0 | 7.5 |
| Elongation, percent | 700 | 755 | 600 | 650 |
| Stress at 300% elongation, g./tex | 2.00 | 1.65 | 1.90 | 2.20 |

[1] Initial viscosity immediately after chain extension—35 poises.
[2] Many weak spots in filaments.

EXAMPLE V (A) Prepolymer

One thousand grams of hydroxylterminated, approximately 2000 molecular weight polytetramethylene-ether glycol was mixed with 54.4 grams of 3,3'-dimethyl-4,4'-diphenylmethane diisocyanate and 200 grams of 4,4'-diphenylmethane diisocyanate. The mixture was heated for one hour at 95° C. with constant agitation to form an isocyanate-terminated urethane prepolymer and then diluted with 500 grams of dimethylformamide. The reacting mixture was carefully isolated from the atmosphere by a blanket of dry nitrogen.

(B) Chain extension

The diluted prepolymer described above was slowly added to a vigorously agitated mixture of 700 grams of DMF, 0.45 gram of diethanolamine, and 4.6 grams of ethylene diamine. A clear solution having a viscosity of 150 poises, a percent solids of 19.5 and a polymer inherent viscosity of 1.38 was obtained. After storage for one month at room temperature, the solution had a viscosity of 165 poises. The ratio of the viscosity immediately after high-shear agitation to the viscosity before high-shear agitation after one month storage was 1.10.

EXAMPLE VI (A) Prepolymer

One thousand grams of a hydroxylterminated approximately 2000 molecular weight copolyester comprising the reaction product of an 8 to 2 molar mixture of ethylene- and neopentyl-glycol with adipic acid was reacted with 26.4 grams of 3,3'-dimethyl-4,4'-diphenylene diisocyanate and 225 grams of 4,4'-diphenylmethane diisocyanate. The reaction was carried out at 95° C. for one hour with constant agitation and under an atmosphere of dry nitrogen. The resulting isocyanate-terminated urethane prepolymer was diluted with 500 grams of dimethylformamide for chain extension.

(B) Chain extension

A portion of the diluted prepolymer from "A" above was added slowly to a vigorously agitated mixture of 700 grams of dimethylformamide, 0.5 gram of diethanolamine and 5.2 grams of ethylene diamine. A viscosity of 100 poises was attained. The resulting solution was clear, had a percent solids of 20.5, polymer inherent viscosity of 1.28, and showed no apparent change in properties after six weeks of room-temperature storage.

EXAMPLE VII (A) Prepolymer

One thousand grams of a hydroxyl-terminated 2000 molecular weight poly(neopentyladipate) glycol was mixed with 25 grams of 2,4'-diphenylmethane diisocyanate and 225 grams of 4,4'-diphenylmethane diisocyanate. The isocyanate-terminated urethane prepolymer which resulted by reacting the above mixture at 95° C. for one hour was diluted with 500 grams of dimethylformamide.

(B) Chain extension

A portion of the diluted prepolymer from "A" above was slowly added with vigorous agitation to a mixture of 700 grams of dimethylformamide, 0.5 gram of diethanolamine, and 4.4 grams of ethylene diamine until a viscosity of 130 poises was attained. A clear, free-flowing solution resulted having a percent solids of 19.2. The resulting polymer had an inherent viscosity of 1.25. The solution showed no signs of change after eight weeks storage at room temperature.

EXAMPLE VIII (A) Prepolymer 750 grams of a hydroxyl-terminated 2,000 molecular weight poly(ethyleneadipate) glycol, 250 grams of a 2,000 molecular weight polypropylene-oxide glycol, and 168.2 grams of 1,6-hexamethylene diisocyanate were mixed together at 105° C. for three hours to obtain an isocyanate-terminated urethane prepolymer.

(B) Chain extension

The prepolymer from "A" above was diluted with 500 grams of dimethylformamide and added slowly to a vigorously agitated mixture of 700 grams of DMF, 0.5 gram of diethanolamine, and 5.2 grams of ethylene diamine. The mixture began to separate into discrete gel particles almost immediately after the addition of diluted prepolymer was begun. The resulting mixture was highly non-homogeneous, comprising high solids content gel particles suspended in a low viscosity solution having a percent solids of only three. This solution could not be used for further processing of the urethane polymer into shaped articles.

EXAMPLE IX (A) Prepolymer 750 grams of hydroxyl-terminated 2,000 molecular weight poly(ethyleneadipate) glycol, 250 grams of polypropylene oxide glycol, 34.6 grams of an 80/20 mixture of 2,4-tolylene diisocyanate and 2,6-tolylene diisocyanate, and 134 grams of 1,6-hexamethylene diisocyanate were reacted for three hours at 105° C., and the resulting urethane prepolymer then was diluted with 500 grams of dimethylformamide.

(B) Chain extension

A portion of the above prepolymer was slowly added to a vigorously agitated mixture of 700 grams of dimethylformamide, 0.5 gram diethanolamine and 5.2 grams of ethylene diamine. Addition of diluted prepolymer was halted when the viscosity reached 50 poises. The solution had a polymer inherent viscosity of 1.18, percent solids of 19.8, and showed no signs of gelling after standing for one week.

EXAMPLE X (A) Prepolymer 1000 grams of a hydroxyl-terminated 2000 molecular weight copolyester comprising the reaction product of a 7/3 molar mixture of hexane-1,6-diol and 2,2-dimethylpropane-1,3-diol with adipic acid was reacted with 222.5 grams of 4,4'-diphenylmethane diisocyanate and 32.6 grams of 3,3'-dimethoxy-4,4'-diphenylene diisocyanate for one hour at a temperature of 95° C. with constant agitation. The resulting substantially linear isocyanate-terminated prepolymer was diluted with 500 grams of dimethylformamide.

(B) Chain extension

A portion of the diluted prepolymer from "A" was slowly added to a vigorously agitated mixture of 700 grams of dimethylformamide, 0.5 gram of diethanolamine and 4.4 grams of ethylene diamine. Addition of diluted prepolymer was discontinued when the viscosity of the prepolymer reached 110 poises. The solution then had a polymer inherent viscosity of 1.36, a percent solids of 19.3, and after six weeks standing at room temperature showed no signs of gelation and only a 15 percent rise in viscosity.

EXAMPLE XI (A) Prepolymer 250 grams of a hydroxyl-terminated 2000 molecular weight poly(neopentyladipate) glycol was mixed with 52.5 grams of 1,5-naphthylene diisocyanate. The mixture was heated to 100° C. for 90 minutes to form an isocyanate-terminated urethane prepolymer which was then diluted with 100 grams of dimethylformamide.

(B) Chain extension

A portion of the prepolymer from "A" was slowly added to a vigorously agitated mixture of 700 grams of dimethylformamide, 1 gram of diethanolamine, and 4.4 grams of ethylene diamine. Gel particles begun to appear immediately after the addition of prepolymer was begun. The resulting suspension of gel particles in the solvent could not be further processed into fibers or films.

EXAMPLE XII (A) Prepolymer 250 grams of hydroxyl-terminated 2000 molecular weight poly(neopentyladipate) glycol was reacted with a mixture of 42 grams of 1,5-naphthylene diisocyanate and 14.8 grams of a mixture of 3,3'-dimethoxy-4,4'-diphenylene diisocyanate. Reaction was carried out at 100° C. for one hour and 30 minutes. The resulting isocyanate-terminated urethane prepolymer was diluted with 100 grams of DMF.

(B) Chain extension

Chain extension was carried out as in part "B," Example "XI." Addition of the diluted prepolymer was halted when a viscosity of 50 poises was attained. There was no evidence of gelation or gel particle formation during chain extension. The resulting polymer solution had a percent solids of 18.6, a polymer inherent viscosity of 1.46, and showed no signs of gelation after standing for two weeks.

EXAMPLE XIII (A) Prepolymer 500 grams of hydroxyl-terminated 2000 molecular weight copolyester glycol comprising the reaction product of a 9 to 1 molar mixture of ethylene glycol and propylene glycol with adipic acid was reacted with 84.2 grams of m-xylylene diisocyanate and 8.7 grams of an 80/20 mixture of 2,4-tolylene diisocyanate and 2,6-tolylene diisocyanate for 90 minutes at 105° C.

(B) Chain extension

Dilution and chain extension of the isocyanate-terminated prepolymer was carried out as in "B" and "C" parts of Example I. The resulting solution had a viscosity of approximately 100 poises, a solids content of 19.1 percent, a polymer inherent viscosity of 1.30 when measured in a DMF solution, and was slightly on the amine side of stoichiometry. This solution showed no signs of gelling after standing for one week.

EXAMPLE XIV (A) Prepolymer 500 grams of the same hydroxyl-terminated copolyester glycol used in Example XIII was reacted with 84.2 grams of m-xylylene diisocyanate and 14.8 grams of 3,3'-dimethoxy-4,4'-diphenylene diisocyanate for 90 minutes at 105° C. The resulting urethane prepolymer was then diluted with 200 grams of dimethylformamide.

(B) Chain extension

A portion of the above prepolymer was slowly added to a vigorously agitated mixture of 700 grams of dimethylformamide, 0.5 gram of diethanolamine and 4.2 grams of ethylene diamine. Addition of the diluted prepolymer was halted when viscosity reached 90 poises. The solution then had a polymer inherent viscosity of 1.30, a percent solids of 19.3, and showed no signs of gelation after standing at room temperature for two weeks.

We claim:

1. In a process for the preparation of a wet-spun high molecular weight substantially linear polyurethane filament the improvement which comprises wet-spinning a polyurethane solution obtained by reacting under substantially anhydrous conditions in a solvent (a) the product of the reaction of a glycol having a molecular weight between 500 and 5,000 and at least two diisocyanates comprising from 75 to 98 mole percent of a first diisocyanate having no substituents alpha to the isocyanate groups and from 25 to 2 mole percent of a second diisocyanate having at least one substituent group alpha to an isocyanate group, said substituent being lower alkyl, lower alkoxy or halogen, and (b) an aliphatic diprimary amine.

2. The process of claim 1 wherein the first diisocyanate is selected from the group consisting of paraphenylene diisocyanate, paraxylylene diisocyanate, metaxylylene diisocyanate, 4,4'-diphenylene diisocynate, 4,4'-diphenylmethane diisocynate, 1,5-naphthylene diisocyanate, cyclohexylene-1,4-diisocyanate, and 1,6-hexamethylene diisocyanate and wherein the second diisocyanate is selected from the group consisting of tolylene 2,4-diisocyanate, tolylene-2,6-diisocyanate, mesitylene diisocyanate, durene diisocyanate, 3,3'-dimethyl-4,4'-diphenylmethane diisocyanate, 3,3'-dimethyl-4,4-diphenylene diisocyanate, 3,3'- dimethyl-4,4'-diphenylene diisocyanate, 3,3'-dimethoxy-4,4'-diphenylene diisocyanate, 2,4'-diphenylmethane diisocyanate, and 2-ethyl-1,3-propane diisocyanate.

3. The process of claim 1 wherein said glycol is selected from the group consisting of polyester glycols, polyether glycols, polyester-polyether glycols, and mixtures thereof.

4. The process of claim 3 wherein the first diisocyanate is 4,4'-diphenylmethane diisocyanate; the second diisocyanate is selected from the group consisting of tolylene-2,4-diisocyanate, tolylene-2,6-diisocyanate and mixtures thereof; and the solvent is dimethylformamide.

5. The process of claim 3 wherein said diamine is ethylene diamine.

6. The process of claim 4 wherein said diamine is ethylene diamine.

7. A filament formed by wet-spinning the polyurethane solution of claim 1.

8. A filament formed by wet-spinning the polyurethane solution of claim 2.

9. A filament formed by wet-spinning the polyurethane solution of claim 3.

10. A filament formed by wet-spinning the polyurethane solution of claim 4.

11. A filament formed by wet-spinning the polyurethane solution of claim 5.

12. A filament formed by wet-spinning the polyurethane solution of claim 6.

References Cited

UNITED STATES PATENTS

| | | | |
|---|---|---|---|
| 2,929,800 | 3/1960 | Hill, Jr. | 260—77.5 |
| 3,373,143 | 3/1968 | Chilvers et al. | 260—75 |

FOREIGN PATENTS

| | | |
|---|---|---|
| 1,005,047 | 8/1965 | Great Britain. |

OTHER REFERENCES

Sealants, Damusis, Reinhold Publishing Corp. pp. 116–133, 1967.

MORRIS LIEBMAN, Primary Examiner

R. ZAITLEN, Assistant Examiner

US. Cl. X.R.

260—75 TNH, 75 NT, 77.5 AM, 77.5 AX, 77.5 AT